UNITED STATES PATENT OFFICE.

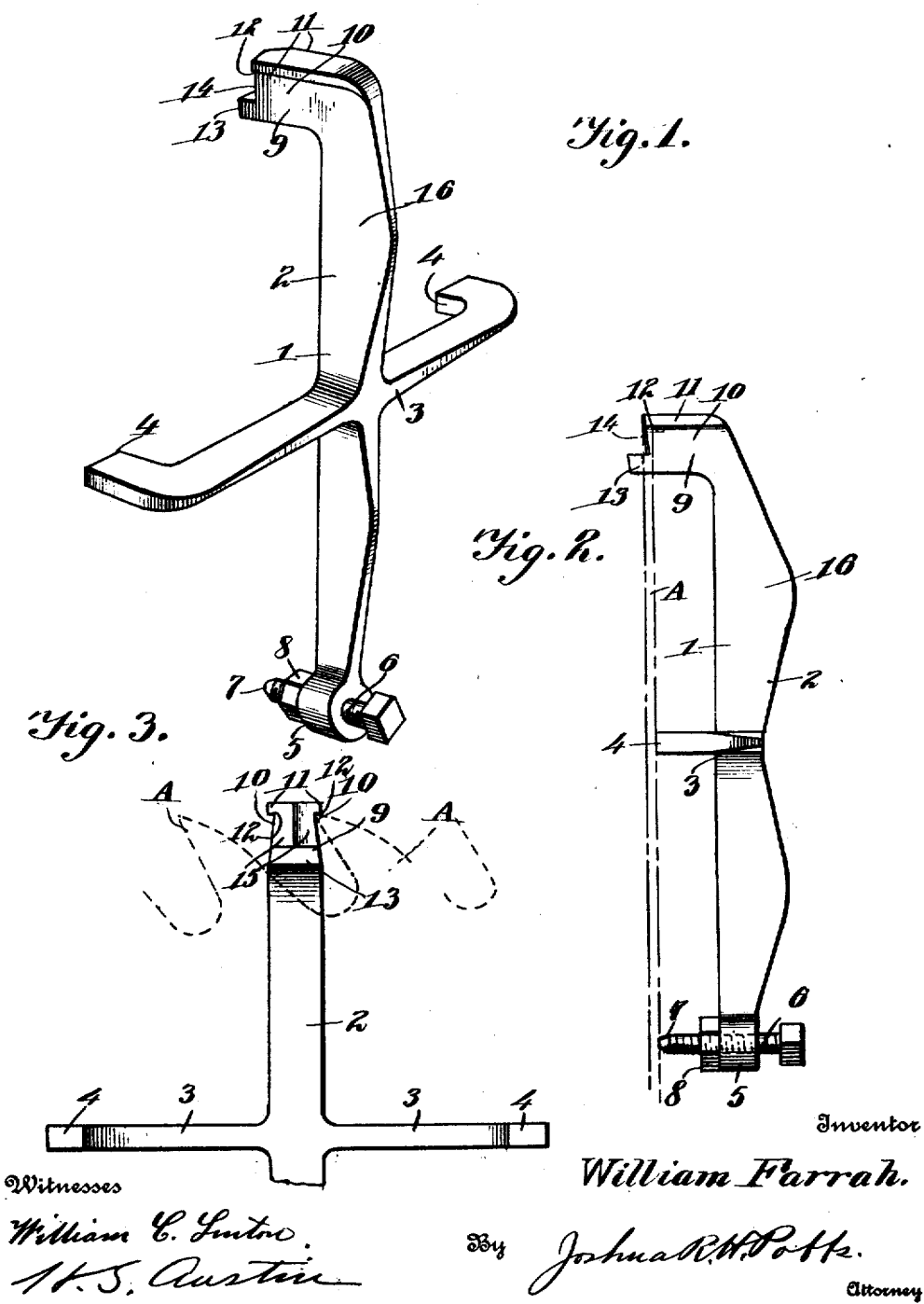

WILLIAM FARRAH, OF GATEWAY, MONTANA.

SAW-FILING DEVICE.

1,011,178.   Specification of Letters Patent.   Patented Dec. 12, 1911.

Application filed December 2, 1910. Serial No. 595,190.

*To all whom it may concern:*

Be it known that I, WILLIAM FARRAH, a citizen of the United States, residing at Gateway, county of Flathead, and State of Montana, have invented certain new and useful Improvements in Saw-Filing Devices, of which the following is a specification.

My invention relates to saw filing devices and particularly to a combination gage and file guiding device.

The object of my invention is to provide a device for use in filing saw teeth after the same have been swaged which shall guide the file and gage the same in order to give a uniform swage to the teeth.

A further object of my invention is to provide a device as mentioned which may be readily adjusted as desired to gage the preferred swage of the teeth.

A further object of my invention is to provide a device characterized as above mentioned which shall be of simple construction and which may be readily and easily operated.

Other objects will appear hereinafter.

My invention will be more readily understood by reference to the accompanying drawings forming a part of this specification and in which—

Figure 1 is a perspective view of a saw filing device embodying my invention in its preferred form, Fig. 2 is a side elevation thereof and Fig. 3 is a front elevation of the upper portion of the device.

Referring now to the drawings, 1 indicates the frame which comprises a longitudinal bar 2 and a transverse cross bar 3, the latter being turned forwardly at their ends forming feet or bearings 4 which rest against the side or face of the saw during the operation of side filing. The lower end of the bar 2 is formed into a sleeve 5 through which is threaded a set screw 6, the end 7 of which impinges against the face of the saw.

8 indicates a jam nut on the screw 6 for securing the same in adjusted position. The function of the screw 6 will appear hereinafter.

The upper end of the bar 2 is bent forwardly forming a head 9, the lateral faces 10—10 thereof are inclined inwardly and upwardly. Extending longitudinally along the upper edges of the head 9 are a pair of ribs 11 the under faces 12 of which form shoulders which rest upon the points of the teeth A of the saw, thereby supporting the device as shown clearly in Fig. 3. The forward end of the head 9 is cut away at the upper portion forming a lower projecting lip or lug 13 upon which the file rests and for limiting the downward movement of the file on the tooth. The forward face of the head, above the lug 13 is inclined slightly forwardly as indicated at 14 in Fig. 2 and said face is laterally beveled from the center forming the two bearing faces for the file which are at a slight angle to each other.

In using the device, after the saw is swaged, one of the shoulders 12 is rested upon one of the teeth of the saw as indicated in Fig. 3 and the screw 6 adjusted until the face 14 is at the desired angle to gage the desired set of the teeth. The file is then rested upon the upper face of the lug 13 and against the face 14 and the side of the tooth is filed until it coincides with said face. The device is then moved to the next tooth but resetting of the device is not necessary. In order to give a better grip for holding the device firmly in position the portion of the bar 2 above the bar 3 is flattened and rearwardly extended as indicated at 16.

Having described my invention what I claim as new and desire to secure by Letters Patent is:

In a device of the class described, a cruxiform frame comprising a vertical member and a transverse member, the ends of said transverse member being bent forward forming bearings, a set screw threaded through the lower end of the vertical member, a forwardly projecting head on the upper end of said vertical member and a lip projecting forwardly from the bottom of said head, substantially as described.

In testimony whereof I have signed my name to this specification in the presence of two subscribing witnesses.

WILLIAM FARRAH.

Witnesses:
CHARLES LENWOOD,
S. P. JOHNSTON.